May 12, 1964 S. H. DOLBEAR 3,132,852
METHOD FOR MINING SOLUBLE MINERAL SUBSTANCES
Filed May 29, 1962
2 Sheets-Sheet 1
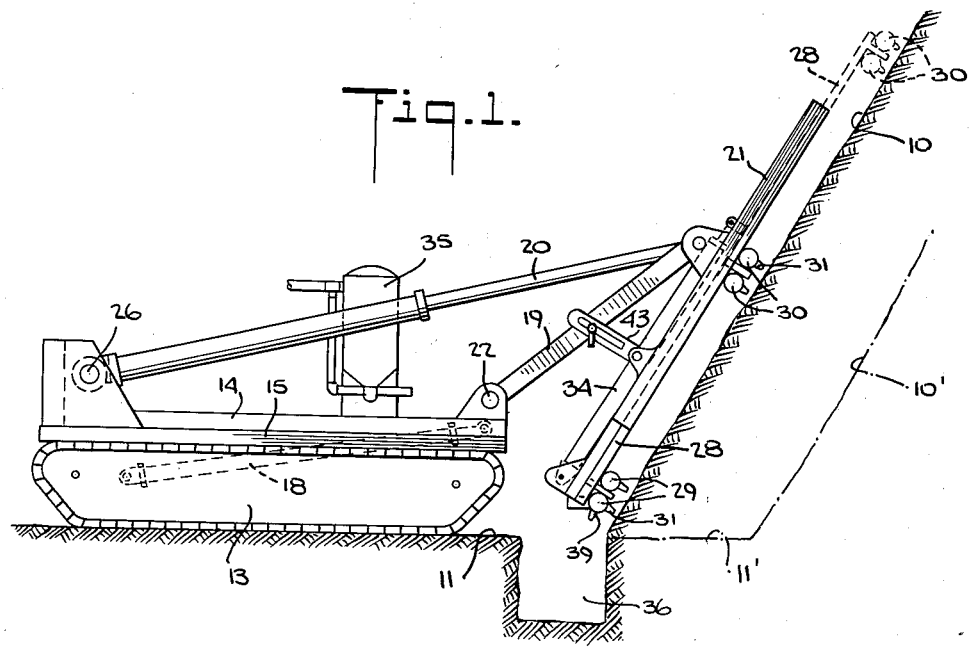
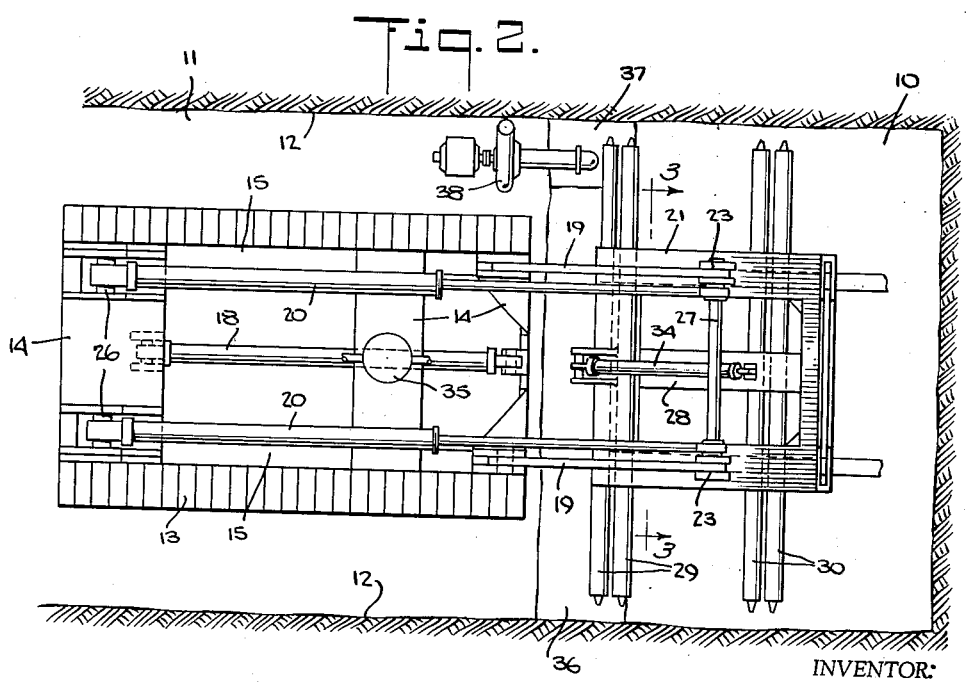
INVENTOR:
SAMUEL H. DOLBEAR
BY
Frederick Breitenfeld
ATTORNEY May 12, 1964 S. H. DOLBEAR 3,132,852
METHOD FOR MINING SOLUBLE MINERAL SUBSTANCES
Filed May 29, 1962 2 Sheets-Sheet 2

INVENTOR:
SAMUEL H. DOLBEAR

BY *Frederick Breitenfeld*

ATTORNEY

United States Patent Office 3,132,852
Patented May 12, 1964

3,132,852
METHOD FOR MINING SOLUBLE
MINERAL SUBSTANCES
Samuel H. Dolbear, 1000 Park Ave., New York, N.Y.
Filed May 29, 1962, Ser. No. 198,614
5 Claims. (Cl. 262—2)

This invention relates generally to the extraction of minerals from the ground, and has particular reference to an improved procedure and installation for the extraction, by solution, of soluble mineral substances from natural beds or deposits.

It is a generally object of the invention to provide a practical and economically feasible means for dissolving, and recovering in the form of brine, mineral substances whose extraction by solution methods has heretofore been difficult or economically impractical.

The invention is particularly applicable to the recovery of underground deposits of potash and other soluble substances which occur in relatively thin beds ranging from 3 feet to 15 feet in thickness at depths of 800 to 3,000 feet or more below the surface. Usually beds of this kind are mined by drilling and blasting, and all attempts to employ "solution mining" techniques (useful for sodium chloride beds occurring in thicknesses of several hundred feet or more) have been unsuccessful. The invention is also applicable to trona beds and to some deposits of borax and sodium chloride.

The improved procedure consists, in brief, in abrading the surface of a subterranean face carrying the mineral to be recovered, then causing water to flow upon the face either simultaneously with or immediately after the abrading procedure, and finally collecting and transporting to recovery apparatus the sludge which is thus produced, the recovery apparatus serving to separate valuable materials from waste and to concentrate or refine the valuable materials. The face chosen for treatment in this way is preferably a mineral-bearing face of a subterranean stope or chamber already formed or resulting from other more conventional and otherwise completed mining operations.

The abrading procedure may consist of impinging upon a face of soluble mineral, insoluble solid particles or missiles, such as sand, crushed rock, or small pieces of metal, with sufficient force to cause, upon impact, the rupturing of the surface of soluble mineral. The insoluble solid particles may be carried against the face in a slurry containing water or brine and the insoluble solid particles. This results in roughening the surface and detachment or release of particles of the mineral therefrom. The water applied to the mineral face serves to dissolve some of the mineral, to form brine, and to carry off the undissolved particles of the mineral released by the abrading operation. This combination of brine and undissolved soluble particles, together, in some case, with the particles of abrasive, form a sludge which is collected preparatory to the recovery operation.

The term "solid particles" as used herein refers to units of abrasive materials such as grains of sand and pieces of crushed rock or metal and is not intended to limit such materials to any specific dimensions or any specific porosity. The term "sludge" as used herein refers to the product, derived from treatment of the mineral face in the manner described, consisting of the combination of brine and undissolved soluble particles and, in some cases, insoluble solid particles. The term "slurry" as used herein refers to the mixture impinged upon the mineral face, in accordance with the present method, consisting of water and insoluble solid particles or, where the water initially applied to the face is recirculated through the slurry-applying apparatus before being delivered to the recovery apparatus, brine and insoluble solid particles. The term "water" as used herein and in the claims is intended to include within its scope water that may have some salts already in solution.

The roughening of the surface of the mineral serves to create a degree of turbulence in the water as it flows over the surface thus aiding the formation of the brine. In addition, as the water or brine carries the abrasive particles with it, these particles scratch the surface thereby contributing additional finely-divided soluble mineral for addition to the brine. With the present invention, therefore, it is possible to produce a solution or brine having a high degree of saturation, i.e., a brine which is saturated or nearly so.

The mineral face is preferably sloped to insure good contact between the water and the mineral face as the water flows over it, but the face is steep enough to insure that the insoluble abrasive particles do not come to rest on the surface and thereby form a bed or layer which prevents access of the descending water or brine to the surface of the soluble mineral. The sludge falling to the floor at the base of the mineral face may be collected in a cistern and then treated either underground or on the surface to remove the abrasive material and to refine the soluble material either as brine or solid.

The abrasive may if desired be particles of iron or magnetite in which case they may be separated from the brine by magnetic means, or they may be recovered by gravity methods commonly used in ore dressing operations, and thereafter returned to the abrasive applying apparatus for reuse. Where the abrasive particles are relatively small they may be propelled against the mineral face by air or water under pressure and this may be accomplished by means of conventional "sand blasting" equipment. However, if it is desired to use an abrading medium larger than sand, such as bird shot or other larger material, these larger particles may be propelled by means of a centrifugal mechanism or other suitable mechanism such as is used in sand blasting or shot peening. Admittedly "sand blasting" per se is well known. However, it is believed that it is a new procedure to use abrasive blasting upon a face of soluble mineral in connection with a solution mining technique in order to create a sludge or solution having a high concentration of the soluble mineral.

The preferred installation for practicing this procedure consists essentially of a maneuverable apparatus within the stope for applying streams of water and abrasive to the wall to be treated, a means for operating the apparatus under visual control so as to apply the streams at a selected area of the face, means for recycling or reapplying some or all of the water or brine, and means for collecting the desired brine and sludge and transporting it to recovery apparatus. The maneuverable apparatus includes a means for advancing it as the wall recedes under the dissolving action of the streams, and includes also a means for supporting and suitably adjusting a structure that carries at least one water and abrasive applicator. The latter may be of any appropriate kind, and a manifold of relatively small jets has proven satisfactory. The means for collecting sludge may include a trench in the floor of the stope extending parallel to the base of the mineral face, and the manifold may include backwardly facing jets for washing the sludge on the floor into the trench.

The procedure obviously requires a supply of fresh water. This can be conducted downwardly to the deposit through pipes extending along a vertical shaft or the like. Since the brine or sludge being pumped or otherwise elevated to the surface is preferably saturated, it may have a tendency to deposit some of the mineral in the pipes or tanks by which it is conveyed, due to a change in temperature of the product. When this occurs the flow of fresh water may be directed into the pipe which ordinarily carries brine and the brine in turn pumped into the pipe which ordinarily carries fresh water. This procedure may be alternated as often as required. In this manner, any mineral collecting in the brine pipe will be dissolved out.

The present method will now be more fully described in connection with an illustrative apparatus, reference being had to the accompanying drawings.

In the drawings:

FIG. 1 is a side elevation of one form of an apparatus for carrying out the invention;

FIG. 2 is a plan view of the equipment shown in FIG. 1;

Figure 3:
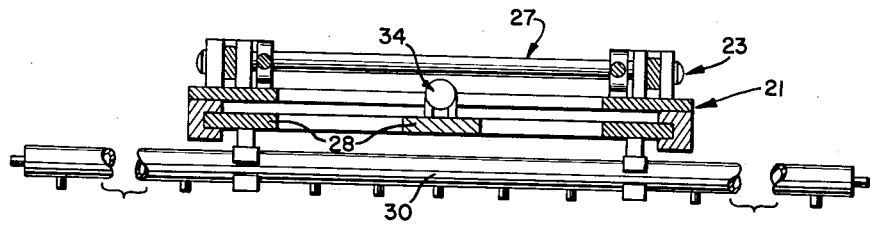
FIG. 3 is a cross-sectional view taken on line 3—3 of FIG. 2.

For the sake of convenience and to simplify the drawings, the hydraulic circuits for operating the hydraulic piston-cylinder devices 18, 20 and 34 are not shown.

In the drawings, the apparatus is shown within a stope or underground chamber having a face of ore 10, a floor 11, and walls 12. With the illustrated apparatus, water and abrasive are applied to the face 10 through jets or sprays mounted in a group on a pipe forming a spray manifold. In the design, means are provided for (a) reciprocating the spray manifold in order to permit the water and abrasive to impinge upon the entire area of the face being treated, (b) adjusting the manifold support so that the angle of the plane in which it reciprocates corresponds to the slope of the face, (c) advancing the manifold to follow the ore face as the latter is dissolved, and (d) collecting and disposing of the sludge formed by the mining operation.

The apparatus includes a tractor-mounted carriage 13 carrying a platform or deck 14 slidably supported in guides 15 fixed to the carriage. The guides 15 permit the platform to be moved toward and away from the face 10 such as by means of a hydraulic piston-cylinder arrangement 18.

The platform 14 carries a pair of links or arms 19 and a pair of hydraulic piston-cylinders 20 for supporting a rectangular frame 21. One end of each arm 19 is pivotally supported, as at 22, on the forward end of the platform 14, and the other end of each arm is pivotally attached, as at 23, to the frame 21, the pivotal attachment being provided with means 43 for clamping the frame 21 at any angle desired relative to the arm 19. Also, one end of each hydraulic piston-cylinder 20 is pivotally supported, as at 26, on the rear end of the platform 14, and the other end of each piston-cylinder 20 is pivotally connected to a rod 27 secured to the frame 21. It will readily be seen from FIG. 1 that by extending or contracting the piston-cylinder devices 20, the angle of the frame 21 will be varied.

Slidable within the frame 21 is another frame 28 (see FIGS. 2 and 3) carrying two spray manifolds 29 at its lower end and two spray manifolds 30 at its upper end. Obviously, additional or fewer manifolds may be provided if desired. Each manifold is provided with a series of nozzles 31 along its length arranged to direct a spray against the face 10. The slidable frame 28 is arranged to be reciprocated with respect to the stationary frame 21 from the position shown in solid lines in FIG. 1 to the position shown in dotted lines and back again. In this way, the spray emitted from the nozzles 31 will be brought to bear against the entire area of the face 10. A hydraulic piston-cylinder device 34 connected at one end to the frame 21 and at the other to the frame 28 effects the reciprocation of the latter frame.

If desired, one each of the manifolds 29 and 30 may be supplied with an abrasive and compressed air, and the other manifolds with water under pressure. Preferably, however, all the manifolds are supplied with a slurry of solid particles in water. This slurry is supplied to the manifolds through flexible hose connections (not shown) from a mixing tank 35 of conventional design carried by the platform 14. When the jets of slurry strike the face of ore 10, the abrasive particles serve to rupture the face and release particles of the soluble mineral. The water striking and running over the face serves to dissolve the mineral of the face and carry off the released mineral particles as well as the abrasive particles. The dissolved mineral and water form a brine which together with the undissolved mineral particles and the abrasive particles forms a sludge on the floor 11 of the stope at the base of the face 10.

For the purpose of collecting this sludge, the floor 11 is provided with a ditch or trench 36 extending parallel to the base of the face 10. The trench slopes from one wall 12 toward the other, and ajacent to the wall at the lower end of the trench is a cistern 37 in which the sludge collects. A pump 38 is provided for pumping the sludge out of the cistern to recovery apparatus above the ground.

Figure 4:
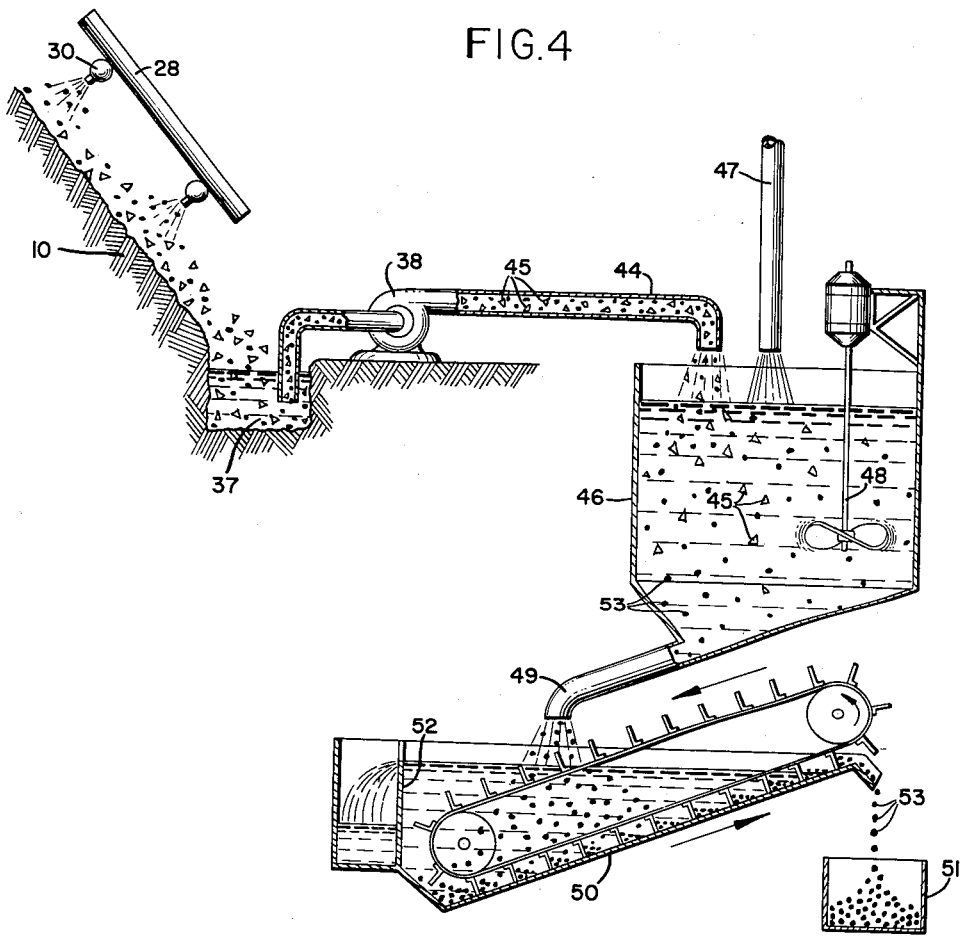
FIG. 4 is a schematic representation of recovery apparatus.

Illustrative recovery apparatus is shown in FIG. 4. A pipe 44 carries the sludge to a tank 46, to which fresh water is delivered through a pipe 47. A motor driven agitator 48 stirs the contents of the tank 46 to dissolve the particles of soluble material 45, leaving a mixture consisting of only solid insoluble particles 53 and brine. This mixture is discharged from the tank at the outlet 49 to a drag classifier 50 of conventional design. The solid particles 53 settle to the bottom of the rectangular classifier tank and are separated from the brine and discharged by the moving drag conveyor into a receptacle 51. The brine flows out of the classifier tank over a launder 52. Should magnetic solid particle abrasive be used, the separation of such particles may be accomplished by substituting a wet magnetic separator of conventional design in place of the drag classifier 50.

As the mining operation proceeds, the face 10 recedes and the manifolds 39 and 30 are maintained in close proximity to the face by means of the piston-cylinder 18 which moves the platform 14 forwardly with respect to the carriage 13. By the time the face reaches, for example, position 10', a new area of floor 11' has been created between the base of the face and the trench 36. Since the floor 11' may not always be adequately sloped, the sludge will not flow by gravity into the trench. Hence, the lowermost manifold 29 is provided with a number of backwardly facing nozzles 39 for moving the sludge along the floor 11' into the trench 36.

It will be seen, therefore, that the present invention sets forth a solution mining technique employing an abrasive along with the solvent for the mineral, and includes a relatively simple yet practical apparatus for carrying out the method.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A method of extracting soluble mineral substances from natural deposits thereof comprising the steps of impinging solid particles upon a face thereof, to produce particles of the mineral, applying water to said face to produce a sludge containing saturated brine, undissolved particles of the soluble mineral, and said solid particles, collecting said sludge preparatory to a recovery operation, and adding water to said sludge after its collection to dissolve said undissolved particles of soluble mineral to form a mixture containing only said solid particles and brine.

2. A method according to claim 1 including the steps of separating said solid particles from said brine, and delivering said brine to recovery apparatus.

3. A method of mining a deposit of soluble mineral comprising abrading a face thereof with insoluble solid particles, applying water thereto to dissolve the desired mineral and produce a solution thereof, and subsequently separating said mineral from said solution.

4. A method of mining a deposit of soluble mineral comprising the steps of abrading a face thereof with insoluble solid particles, applying water to said face to dissolve the desired mineral and also carry off undissolved particles of said desired mineral, and subsequently separating said mineral from said water.

5. A method of mining a deposit of soluble mineral substance comprising the steps of impinging magnetic solid particles upon a face thereof, applying water to said face to dissolve the desired mineral and to produce a sludge containing the magnetic solid particles, and subsequently separating said solid particles from said sludge by subjecting said sludge to a magnetic force which attracts said solid particles.

References Cited in the file of this patent
UNITED STATES PATENTS

| | | |
|---|---|---|
| 372,154 | Krause | Oct. 25, 1887 |
| 2,233,260 | Hawthorne | Feb. 25, 1941 |
| 2,251,916 | Cross | Aug. 12, 1941 |